(12) United States Patent
Van Voorhis (10) Patent No.: US 7,870,138 B2
(45) Date of Patent: Jan. 11, 2011

(54) FILE STORAGE AND RETRIEVAL METHOD

(76) Inventor: Richard Alton Van Voorhis, 178 Stanford Ct., Irvine, CA (US) 92612

( * ) Notice: Subject to any disclaimer, the term of this patent is extended or adjusted under 35 U.S.C. 154(b) by 194 days.

(21) Appl. No.: 11/378,122

(22) Filed: Mar. 17, 2006

(65) Prior Publication Data

US 2007/0198567 A1    Aug. 23, 2007

(51) Int. Cl.
*G06F 17/30*    (2006.01)
*G06F 7/00*    (2006.01)
(52) U.S. Cl. .................. 707/741; 707/781; 707/770; 707/830
(58) Field of Classification Search ............. 707/6
See application file for complete search history.

(56) References Cited

U.S. PATENT DOCUMENTS 5,218,700 A * 6/1993 Beechick ............... 712/300
5,283,894 A * 2/1994 Deran .................. 707/704
5,519,858 A * 5/1996 Walton et al. .......... 707/10
2006/0224578 A1* 10/2006 Kadatch et al. ......... 707/5

FOREIGN PATENT DOCUMENTS

WO    WO 9510091 A1 *    4/1995

OTHER PUBLICATIONS

U.S. Appl. No. 08/179,316, Van Voorhis, Richard A.

* cited by examiner

*Primary Examiner*—Greta L Robinson
*Assistant Examiner*—James J Wilcox
(74) *Attorney, Agent, or Firm*—Fellers, Snider, Blankenship, Bailey & Tippens, P.C.

(57) ABSTRACT

A file storage and retrieval method or technique for processing alphanumeric information that has particular advantages when accessing data in a database on a computer. The retrieval technique uses the ASCII values of characters in a search string concatenated together to form a numeric value which serves as the index to the data itself or to the index which holds the computer address of the location of the data. This technique allows data to be accessed with only one access when searching for a word or phrase within a database and lends itself for use on static storage systems of the future as well as on current disk based systems.

4 Claims, 11 Drawing Sheets

| | | | | | |
|---|---|---|---|---|---|
| First Key | 066073076076032 | | | | |
| Last Key | 083085083073069 | | | | |

| Index | Key | Prior Index | Next Index | Data |
|---|---|---|---|---|
| 066073076076032 | BILL | 0 | 066079066032032 | * |
| 066079066032032 | BOB | 066073076076032 | 066079066066089 | * |
| 066079066066089 | BOBBY | 066079066032032 | 073078069090032 | * |
| 073078069090032 | INEZ | 066079066066089 | 083085069032032 | * |
| 083085069032032 | SUE | 073078069090032 | 083085083055078 | * |
| 083085083055078 | SUSAN | 083085069032032 | 083085083073069 | * |
| 083085083073069 | SUSIE | 083085083055078 | 0 | * |

Index Structure "A"
Index Structure "B"
Index Structure "C"

* Remaining data for this record.

Concatenated ASCII values of a string used as the index to store associated data. With data stored at the same index.

FIG 1. B-Tree Index Structure

PRIOR ART

FIG 2. B-Tree Index Structure, Binary Tree

W / 1 Key and 2 Branches / Node

PRIOR ART

FIG 3. B-Tree Index Structure, Multi-Way Tree
W / 2 Keys and 3 Branches / Node

PRIOR ART

FIG 4. B+-Tree Index Structure
W / 1 Query Value and 2 Branches / Node
PRIOR ART FIG 5. B+-Tree Index Structure
W / 2 Query Values and 3 Branches / Node
W / 1 Key / Leaf Node

PRIOR ART

FIG 6. B⁺-Tree Index Structure

W / 1 Query Value and 2 Branches / Node

W / 3 Keys / Leaf Node

PRIOR ART

FIG 7. B+-Tree Index Structure

W / 2 Query Values and 3 Branches / Node

W / 3 Keys / Leaf Node

PRIOR ART

Search String

"BOBbb"

ASCII Equivalent Concatenated Numeric String

| B | O | B | b | b |
|---|---|---|---|---|
| 066 | 079 | 066 | 032 | 032 |

↑ This is the index to the data related to "BOB", see FIGURE 10.

FIG. 8: Concatenated ASCII string values used as an index to data in a database with the data stored at the same index.

Search String

"BOBbb"

ASCII Equivalent Concatenated Numeric String

| B | O | B | b | b |
|---|---|---|---|---|
| 066 | 079 | 066 | 032 | 032 |

↑ This is the index to the data related to "BOBbb", see FIGURE 11.

FIG. 9: Concatenated ASCII string values used as an index to data in a database with the data stored at an indirect address.

FIG. 10: Concatenated ASCII values of a string used as the index to store associated data. With data stored at the same index.

FIG. 11: Concatenated ASCII values of a string used as an index for storing associated data. With the data stored at another indirect address.

FILE STORAGE AND RETRIEVAL METHOD

BACKGROUND OF THE INVENTION

1. Field of the Invention

This invention relates to a file storage and retrieval technique for processing alphanumeric information that has particular advantages in implementing database queries.

2. Brief Description of the Prior Art

In the computer arts, data is typically stored in some form of non-volatile storage system, such as magnetic disks, in the form of data files. These files are subdivided into data records, which are subsets of the file itself. Processing is done within each file by accessing the data records. Users conduct transactions against a file, inserting, deleting retrieving and updating data records.

For very large data bases it is extremely inefficient and time-consuming to sequentially search all data records in a file in order to find a particular record to access, modify or delete, or to locate the appropriate place to add a new record.

A more efficient, but still cumbersome and time-consuming, search method requires creating a search key for each data record which uniquely identifies the record. Each search key is associated with a record pointer that indicates the location in the computer storage system of the data record associated with the search key. A common type of pointer is a relative record number. Through the use of such record pointers, the data records themselves need not be kept in sequential order, but may be stored in random locations in the computer storage system. A search for a particular data record is enhanced by sequentially searching a compiled index of such search key records (comprising search keys and record pointers), rather than the date records themselves. However, such sequential searching is still relatively slow.

Figure 1:
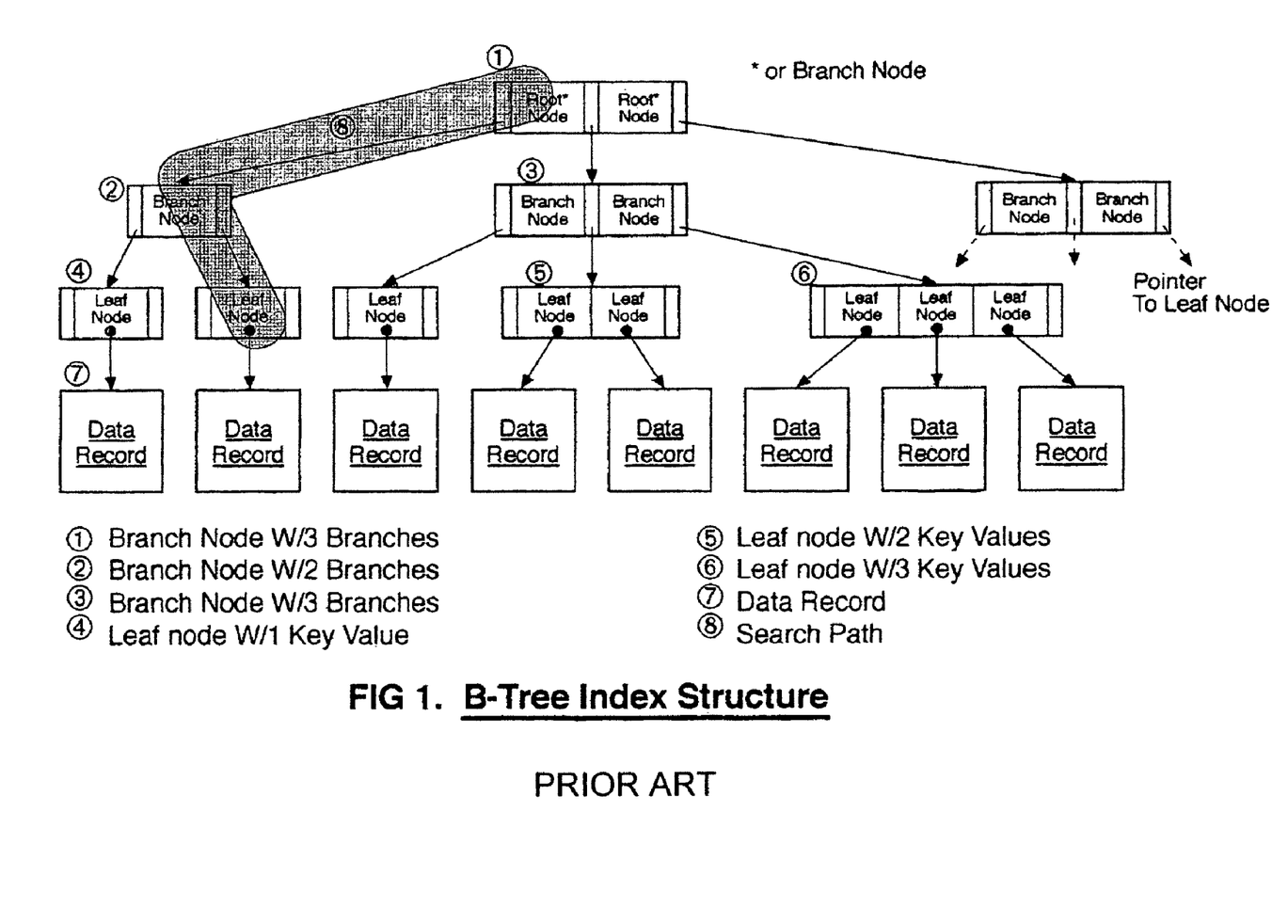
FIG. 1 is a prior art schematic diagram of a B-Tree Index Structure for indexing data records in a computer storage system. This diagram shows the basic elements of tree structures.

A much more efficient method for such a key index is to create a "tree" structure, rather than a sequential file, for the key records. One such tree structure is a B-Tree, an example of which is shown in FIG. 1. The use of B-Trees to structure indexes for data files in computer storage systems is well known in the prior art. (See, for example, Knuth. The Art of Computer Programming, Volume 3, pages 473-479).

A B-Tree consists of nodes which can be either a root node, branch nodes or leaf nodes. A branch node contains-at least one search key and related pointers (such as relative addresses, node numbers) to other nodes. A leaf node contains at least one search key and a pointer to a data record. One node in the tree is the root node or starting point, which can be either a leaf node (only for a tree with a single node) or a branch node. The "height" of a tree is equivalent to the number of nodes traversed from the root node to a leaf node. Searching for a data record is accomplished by comparing a key to the contents of the root node, branching to branch nodes based on such comparisons, comparing the key to the contents of such branch nodes, and continuing "down" the height of the tree until a leaf node is reached. The key is compared to the contents of the leaf node, and one of the pointers in the leaf node is used to locate the desired data record (if one exists).

Figure 2:
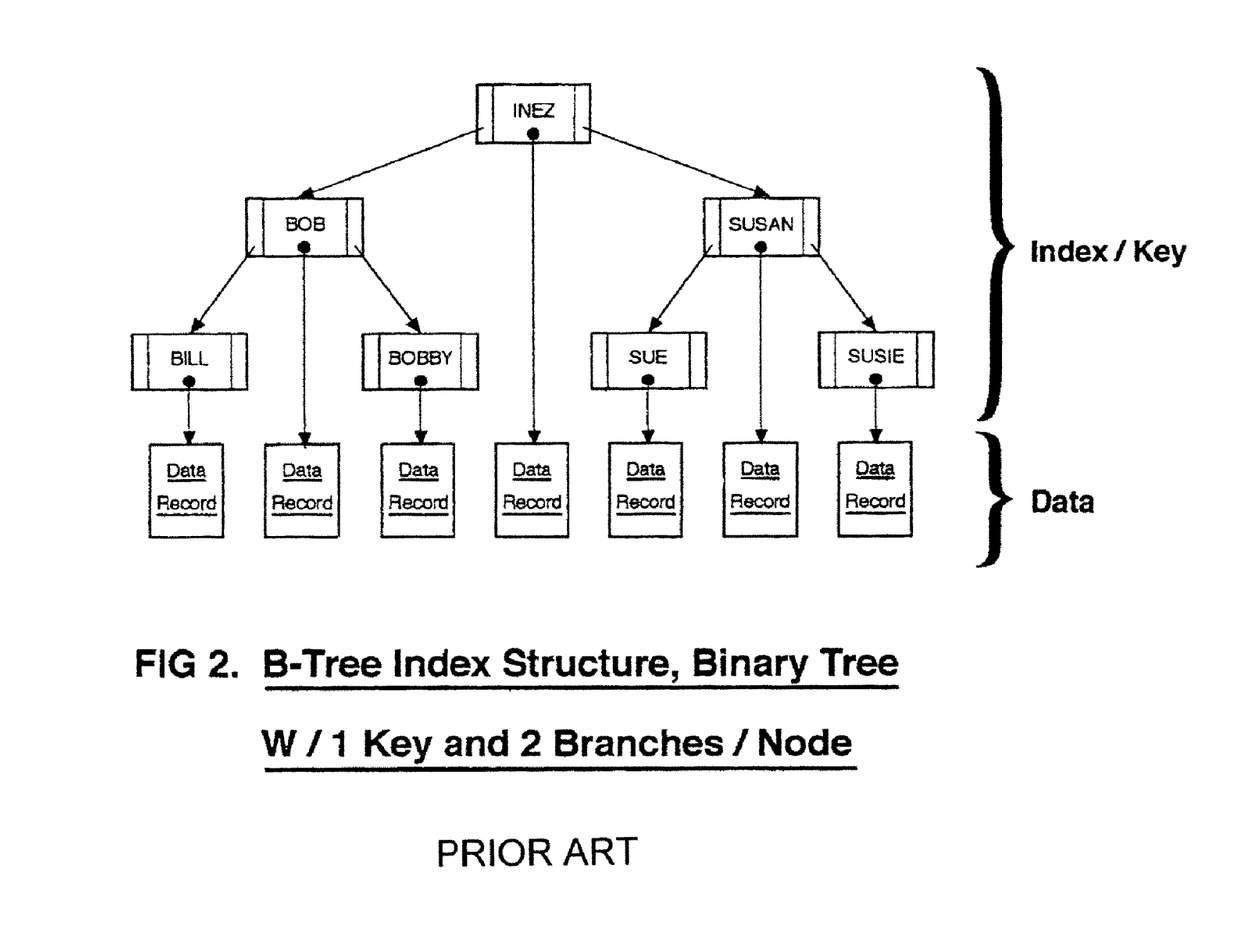
FIG. 2 is a prior art schematic diagram of a B-Tree Index Structure, Binary Tree, with one Key and two Branches/Node.

In the most simple B-Tree, see FIG. 2, each node contains one search key and two associated pointers. Such a tree structure, sometimes referred to as a binary tree, theoretically provides a very efficient search method. If the number of nodes in this type of tree is equal to or less than $2^n$, then only "n" comparisons are required to locate a data record pointer in any leaf node.

Figure 3:
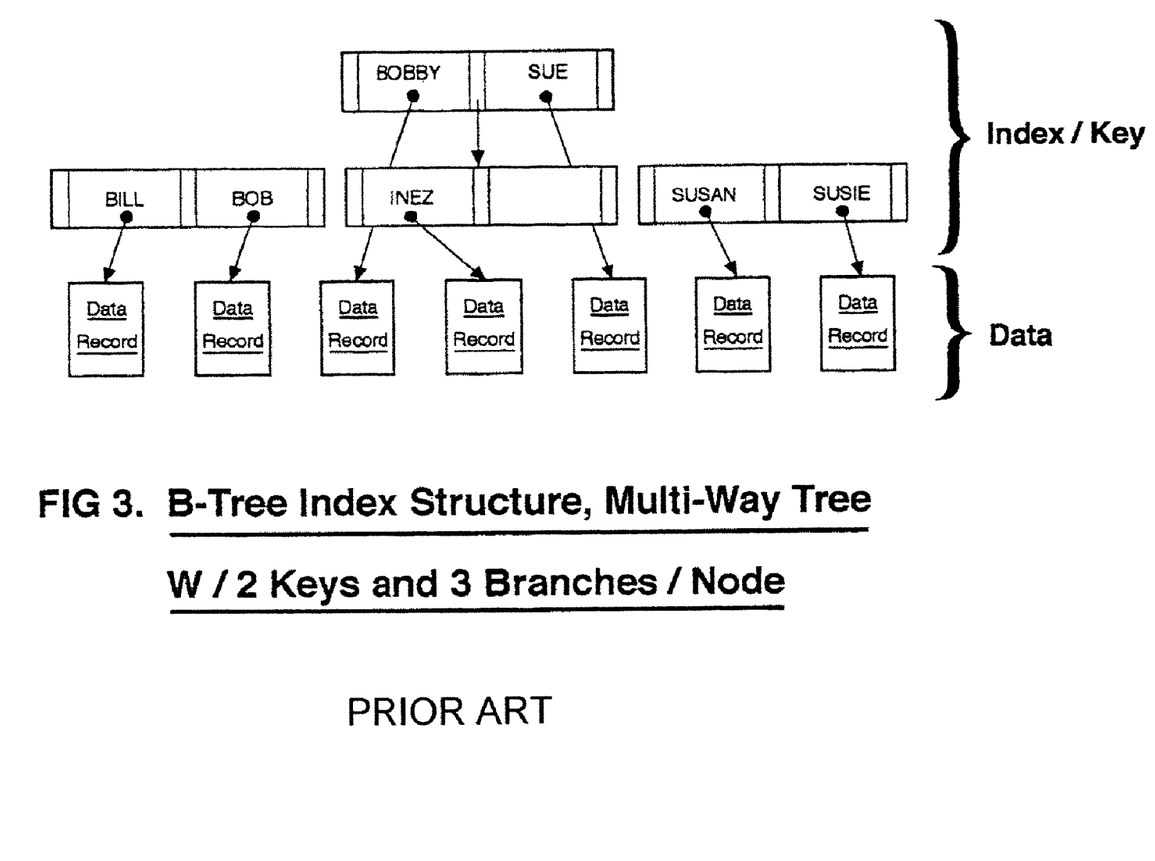
FIG. 3 is a prior art schematic diagram of a B-Tree Index Structure, Multi-Way Tree, with two Keys and three Branches/Node.

In practice, a simple binary tree is inefficient. Most data bases are stored on relatively slow storage systems, such as magnetic disks. The time required to access any item of data (such as a tree node) on such a storage device is dominated by the "seek" time required for the storage unit to physically locate the desired storage address. Following each seek, the contents of a node may be read into the high-speed memory of the computer system. In a simple binary tree, for each access of a node, only a two-way decision (to the left or right branch from that node) can be made since the node contains only one search key. If instead of containing only one search per node, a node contains several search keys, then for each seek operation, several keys will be read into the high speed memory of the computer system. With one search key per node, a comparison and determination can be made that the item sought for is one half the remainder of the tree. With "n–1" search keys per node, the search can be narrowed to "1/n" of the remainder of the tree (for example, with 9 search keys per node, a search can be narrowed to "1/10" of the remainder of the tree). This type of structure is known in the prior art as a "multi-way" tree. See FIG. 3.

It is advantageous to have as many search keys as possible per node. Thus, for each seek of a node, several search keys can be examined and a more efficient determination can be made as to the location of the next node or, in the case of a leaf node, of a data record. The height of the tree, and hence the search time, is dramatically decreased if the number of search keys per node is increased.

Figure 4:
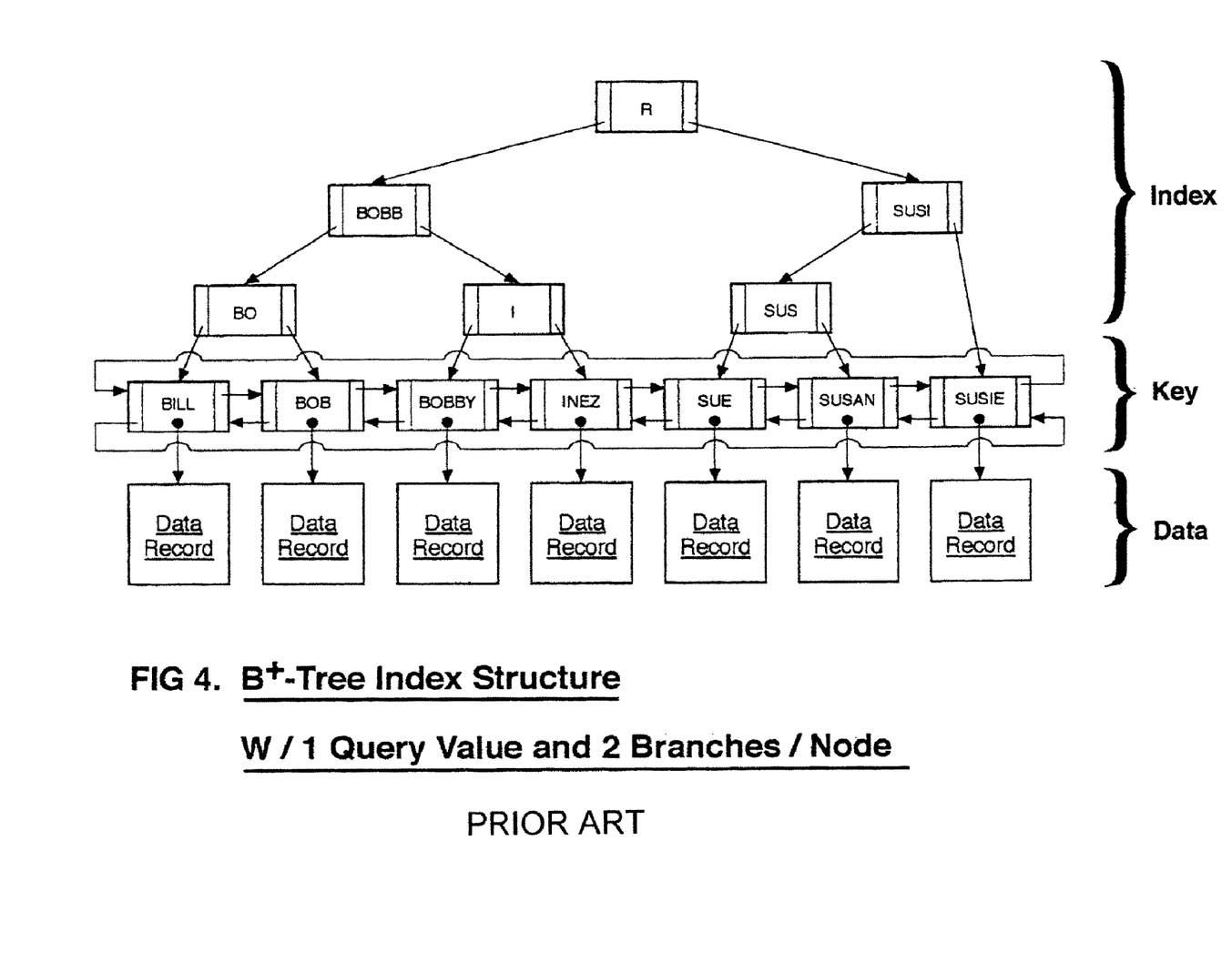
FIG. 4 is a prior art schematic diagram of a B+-Tree Index Structure with one Query Value and two Branches/Node and one Key/Leaf Node.
Figure 5:
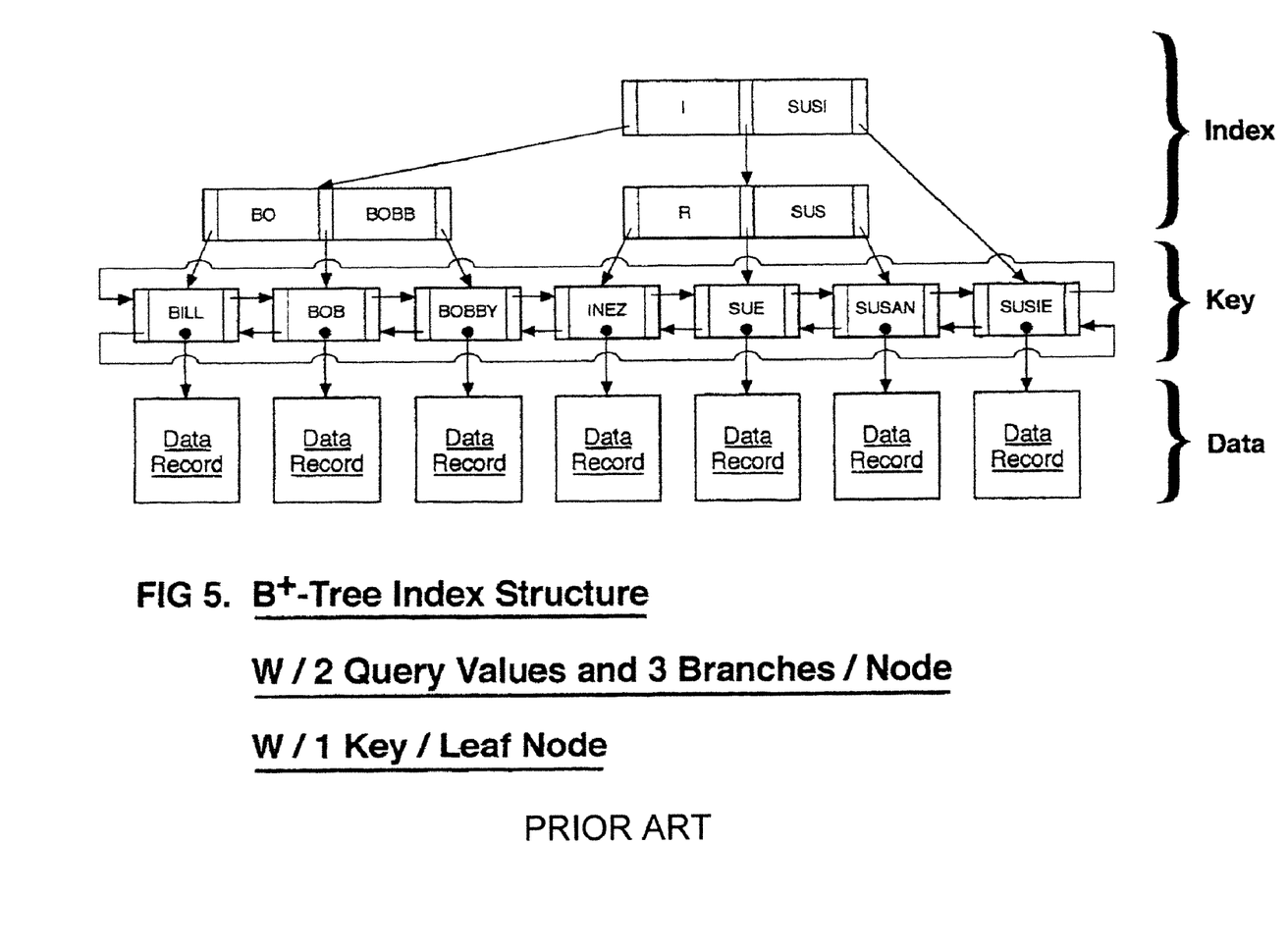
FIG. 5 is a prior art schematic diagram of a B+-Tree Index Structure with two Query Values and three Branches/Node and one Key/Leaf Node.
Figure 6:
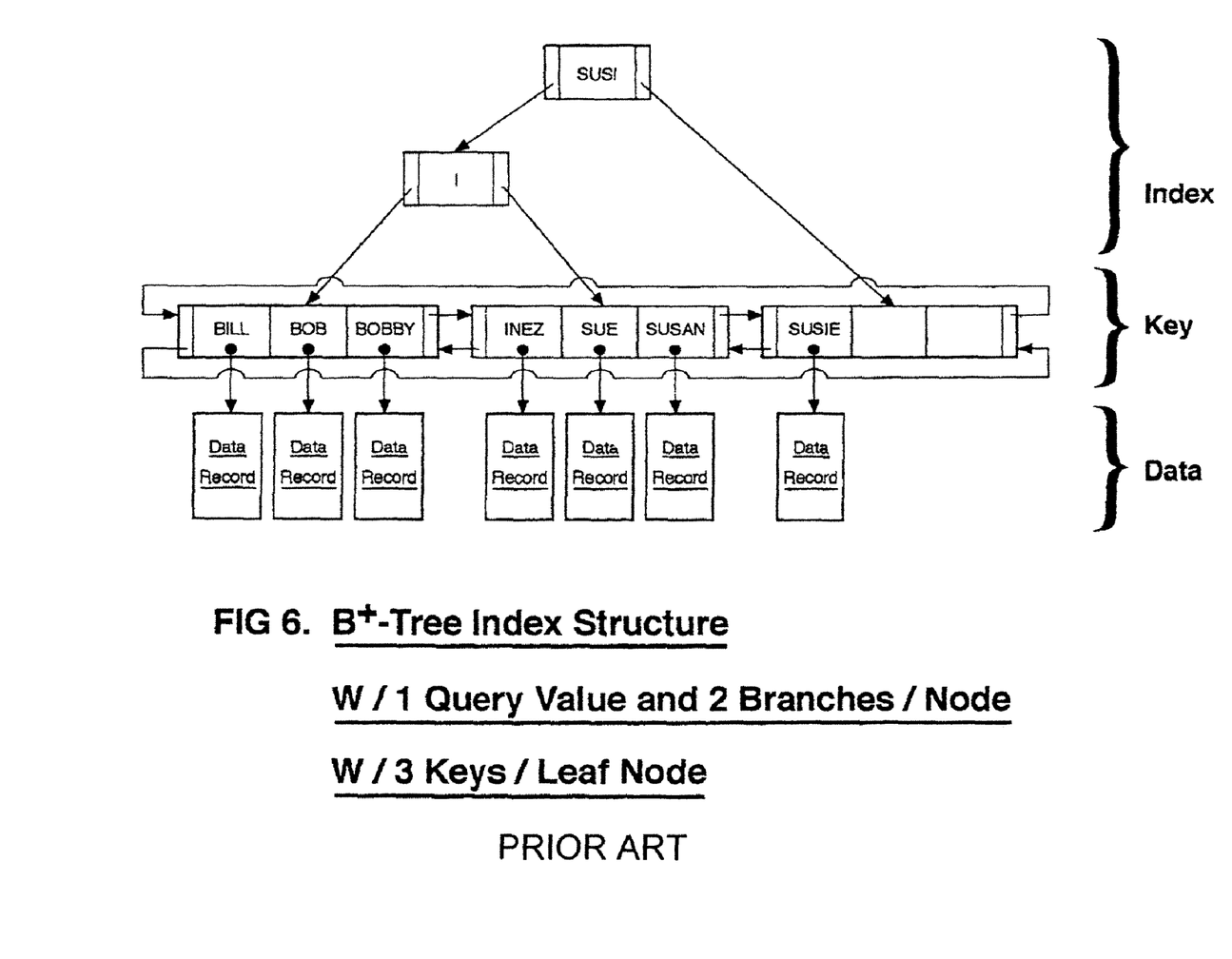
FIG. 6 is a schematic diagram of a B+-Tree Index Structure with one Query Value and two Branches/Node and three Keys/Leaf Node.
Figure 7:
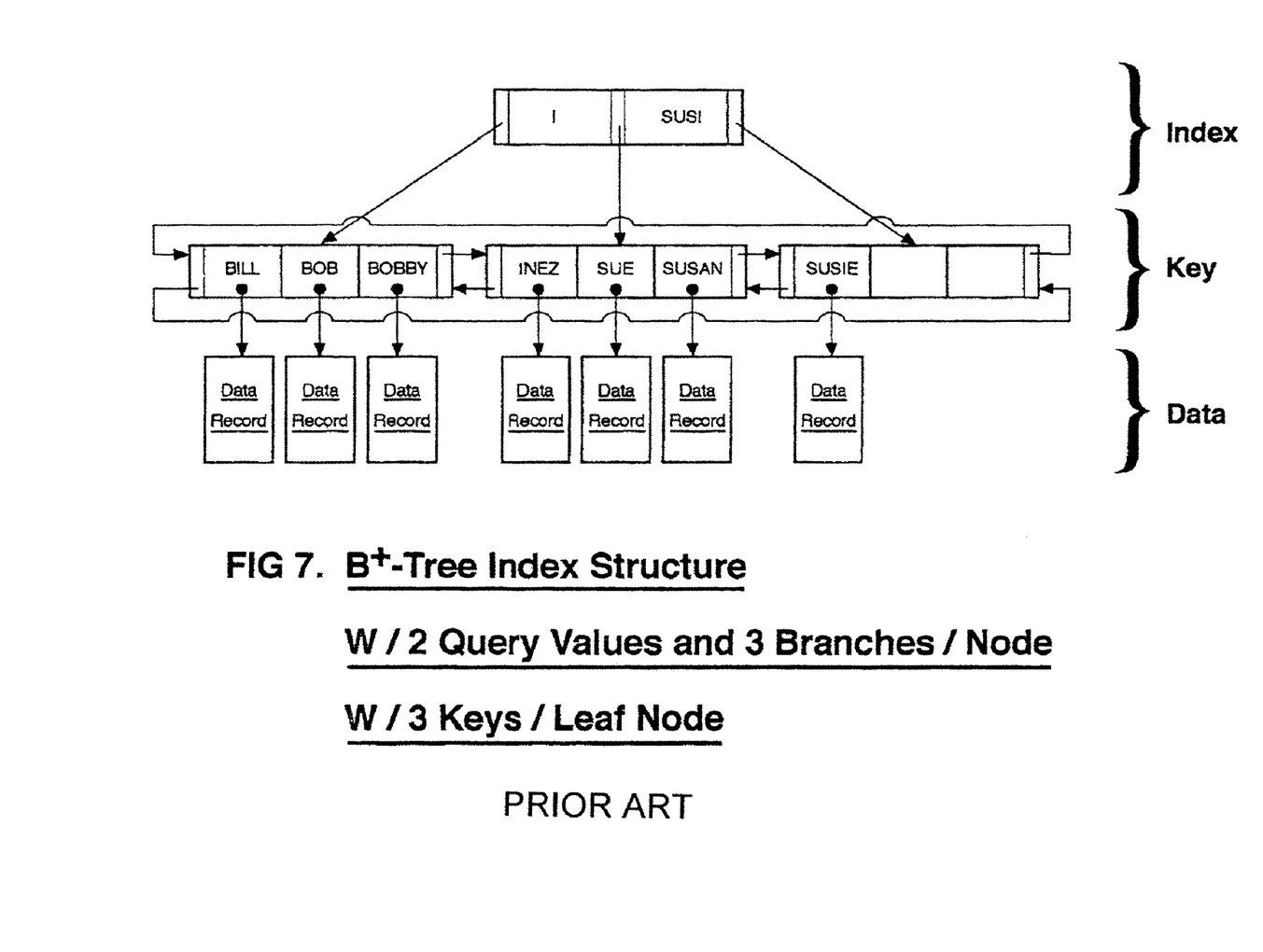
FIG. 7 is a prior art schematic diagram of a B+-Tree Index Structure with one Query Values and three Branches/Node and three Keys/Leaf Node.

An even later development in tree structures is the B+-Tree which uses query values in place of actual search key values in the branch nodes and places all key values in leaf nodes, as shown in FIG. 4. (See, for example, D. Comer 1979, "The Ubiquitous B-Tree," ACM Computing Surveys Vol. 11, No. 2, June, 1979, pgs. 130-131). This structure has all of the advantages of B-Trees as well as having a much smaller index for accessing for keys. B+-Trees use multiple query values in branch nodes, as shown in FIG. 5 and FIG. 7 as well as multiple keys per leaf node, as shown in FIGS. 6 and 7.

The state of the art appears to be in some similar form of the B-Tree and the B+-Tree as shown here as prior art.

The process of actually building a tree structure using any of the current methods results in branches becoming unbalanced based on the order in which keys are added and/or deleted from the data base. When the branches are out of balance more than $2^n+1$ comparisons may be required when searching for one particular key. These structures must be balanced regularly and never remain in a totally balanced condition. B+-Trees additionally may require new query values to be established while being balanced.

The present invention solves the problem of accessing data in a database. Since all words and/or selected phrases in the database are stored as concatenated strings of their ASCII characters, any word or phrase can be found with only one access. This requires systems to have very large indexes within a database which will be a result of computer systems in the very near future. This process may also be scaled back for use on today's system.

SUMMARY OF THE INVENTION

Figure 8:
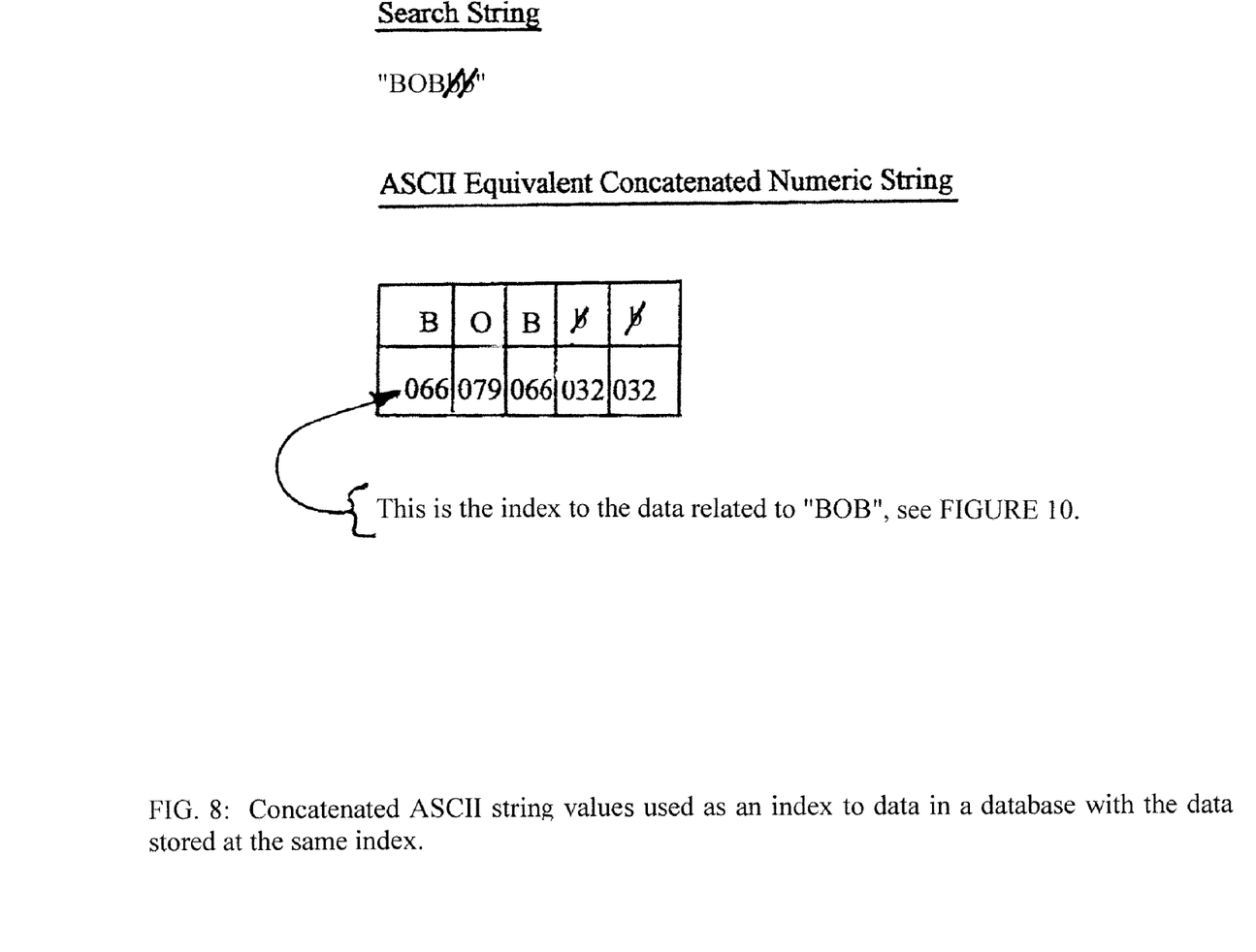
FIG. 8 is a schematic diagram of concatenated ASCII String Values used as an address with the data stored at the same location.
Figure 9:
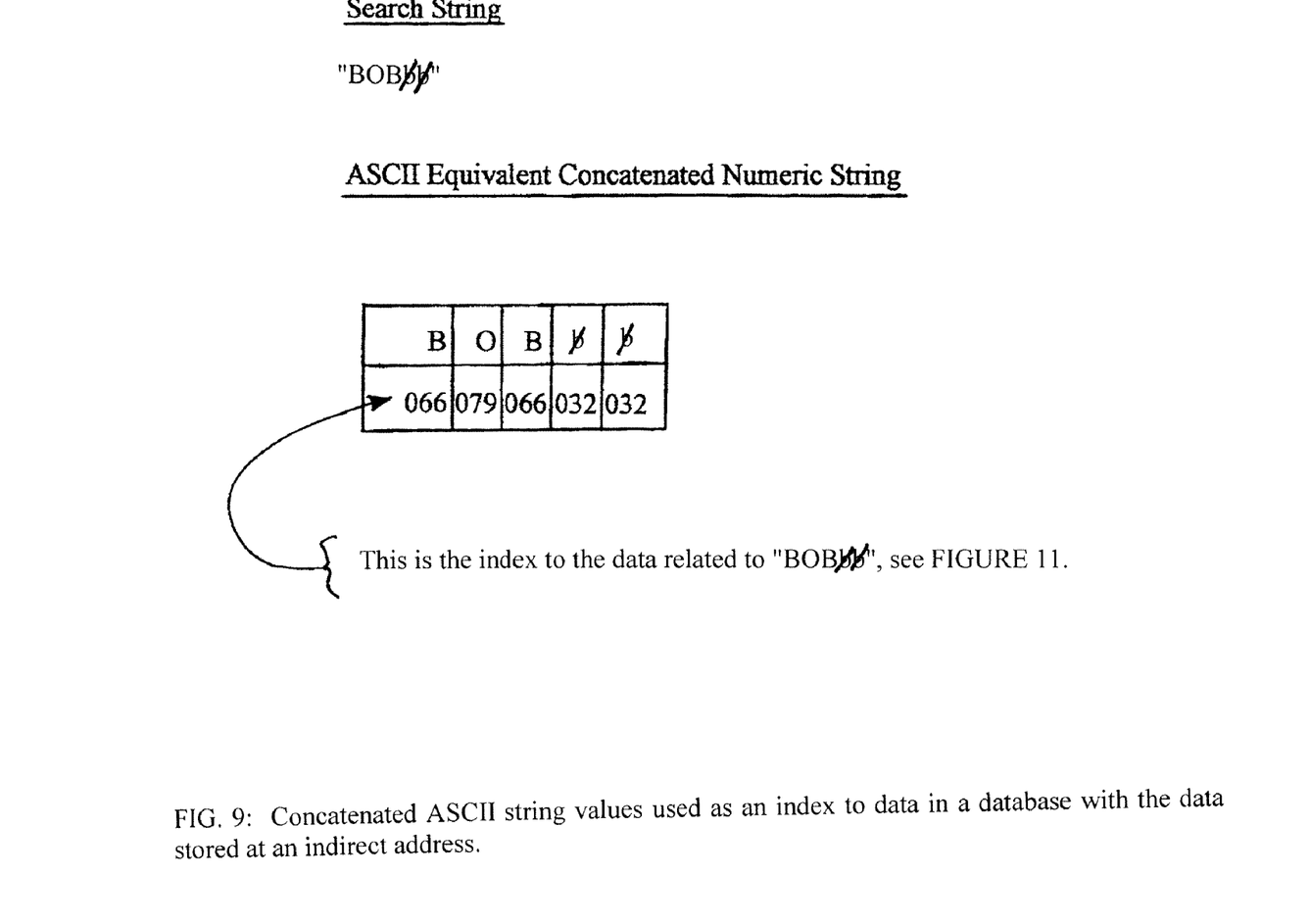
FIG. 9 is a schematic diagram of concatenated ASCII String Values used as an indirect address which holds the address of the stored data.

The inventive file storage and retrieval method uses the ASCII values of the characters in the search string concatenated together to form a numeric value which serves as the index to the data itself, see FIG. 8, or as the index which holds the address of the location of the data in the system. See FIG. 9. When a database is created these ASCII character string indexes are written into the file to allow quick access when retrieving information. This means that any character string written to a file can be retrieved directly in just one access.

A method for creating a database structure using the concatenation of the ASCII values in an alphanumeric string which serves as a numeric index to store the alphanumeric string and its related data in a computer.

The method further includes the step of retrieving data using alphanumeric strings by using the concatenation of the ASCII values in the alphanumeric string which serves as a numeric index to allow for the retrieval of the alpha-numeric string and its related data in the computer.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Throughout this description, the preferred embodiment and examples shown should be considered as exemplars, rather than limitations on the method of the present invention.

The inventive file storage and retrieval technique is primarily designed for use with large data files running on static (non-movable) media systems of the future. This creative idea, however, lends itself to use in current day systems as well.

Figure 10:
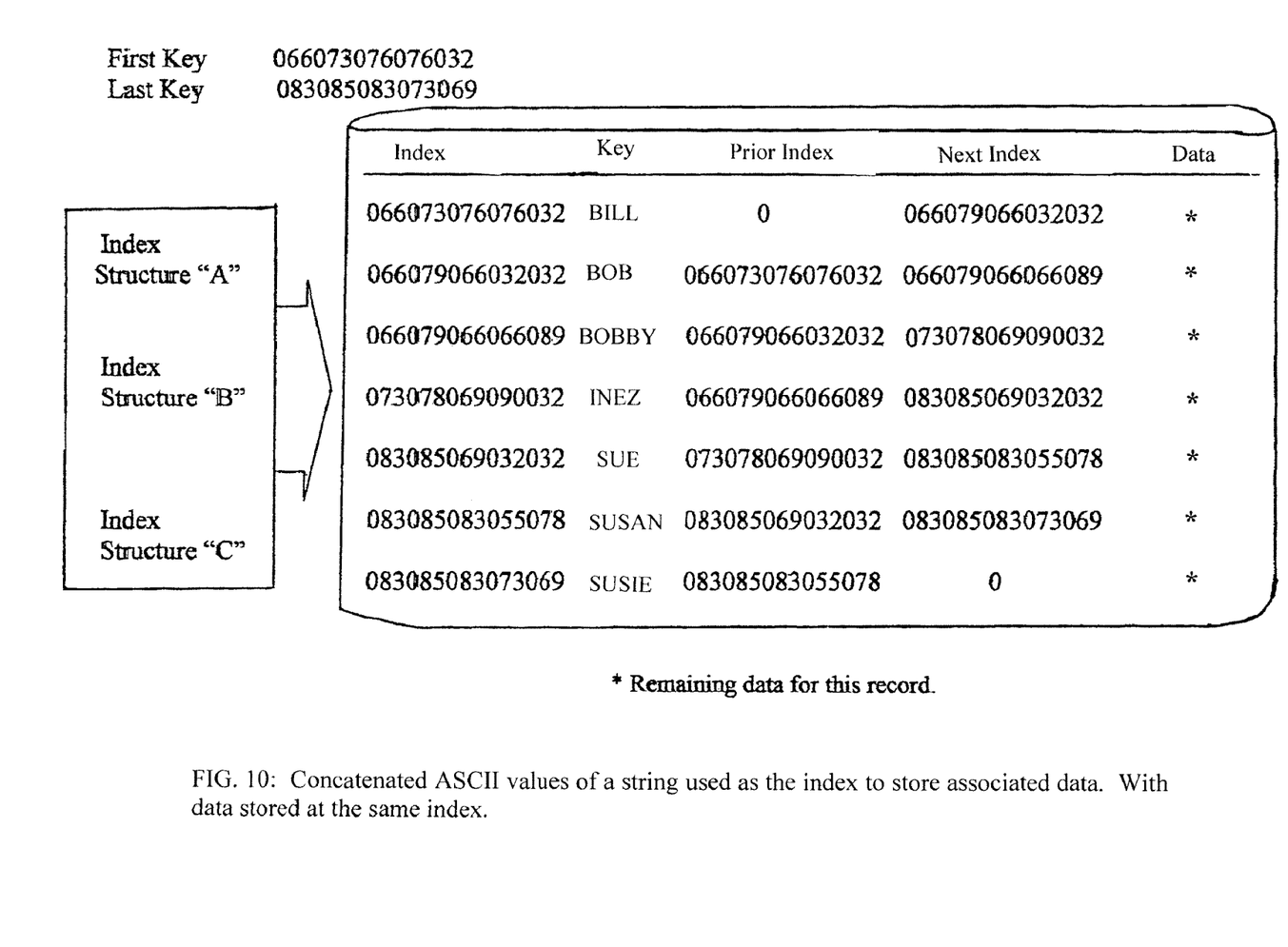
FIG. 10 is a schematic diagram showing concatenated ASCII values of a string used as an index for storing associated data. The date is stored at the same index.

This inventive Structure is best illustrated through an example as follows:

Any indexing scheme may be used to create this database. When a string of characters is used as a key to the database the prior and next pointers have already been established and are stored as data in the database record. The concatenated ASCII values of the string may be used as an index to store the associated data. This data is then written to the database as shown in FIG. 10. In this example the data is written at the index constituting the concatenated ASCII values of the characters in the string.

Figure 11:
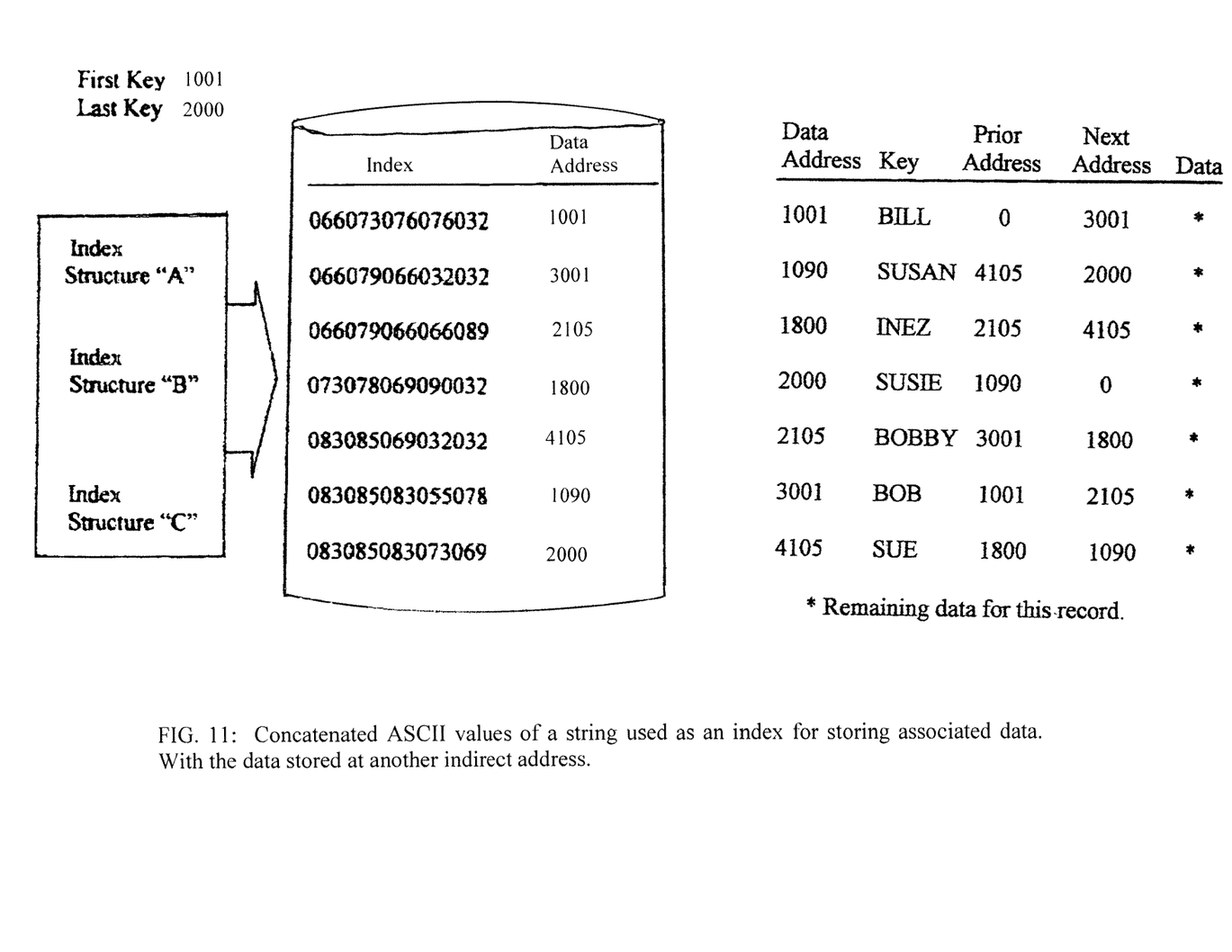
FIG. 11 is a schematic diagram showing concatenated ASCII values of a string used as an index for storing associated data. The associated data is stored at another indirect address.

Data may also be written to the database as shown in FIG. 11. This figure shows an example of storing the data related to the string characters at an indirect address which is stored at the index constituting the concatenated ASCII values of the string characters.

The indexes created by concatenating the ASCII values of the string characters may become very large but systems of the future should easily be able to accommodate addresses well over ten to the $100^{th}$ power.

What is claimed is:

1. A file storage and retrieval method for accessing data in a database on a computer comprising the steps of:
   in a search string comprised of alphanumeric characters, using an ASCII value for each of said alphanumeric characters;
   concatenating together said ASCII value of each of said alphanumeric characters beginning with an ASCII value of a first character in said search string and continuing to concatenate the ASCII values of said alphanumeric characters sequentially through all said alphanumeric characters in said search string to a last character of said search string to form a numeric index value that serves as an index;
   wherein at said index either an address or related information resides;
   wherein said related information is selected from a group consisting of said search string, pointers to a prior index, pointers to a next index, pointers to a prior address, pointers to a next address, and any remaining data;
   wherein said related information is stored at said index or wherein said numeric index value serves as an index to said address where said related information is stored;
   wherein said related information or said address may be accessed by only one access.

2. A method of accessing data in a computer database comprising the steps of:
   in a word or phrase comprised of characters, substituting ASCII values for said characters of said word or phrase;
   concatenating said ASCII values of said characters of said word or phrase beginning with an ASCII value of a first character in said word or phrase and continuing to concatenate an ASCII value of each of said characters sequentially through all said characters in said word or phrase to a last character of said word or phrase to create an index value that serves as an index;
   wherein at said index either an address or related information resides;
   wherein said related information is selected from a group consisting of said word or phrase, pointers to a prior index, pointers to a next index, pointers to a prior address, pointers to a next address, and any remaining data;
   finding said word or phrase stored in a computer with only one access using said index of said database, wherein said word or phrase and said related information is stored at said index in just one access or finding said address where said word or phrase and said related information is stored in said computer in just one access.

3. A computer database file storage and retrieval method comprising the steps of:

in a search string comprised of characters, using ASCII values for said characters of said search string;

concatenating said ASCII values of said characters of said search string together beginning with an ASCII value of a first character in said search string and continuing to concatenate an ASCII value of each of said characters sequentially through all of said characters in said search string to a last character of said search string to form a numeric value that serves as an index;

wherein at said index either an address or related information resides;

wherein said related information is selected from a group consisting of said search string, pointers to a prior index, pointers to a next index, pointers to a prior address, pointers to a next address, and any remaining data;

utilizing said numeric value as said index to access said related information stored in a computer at said index or utilizing said numeric value as said index to access said address of a location that the related information is stored in said computer;

wherein said search string and said related information can be retrieved from the database file in just one access or wherein the address where the search string and said related information is stored in said computer can be retrieved from the database file in just one access.

4. An indexing scheme for a computer database comprising the steps of:

in a string of characters, using ASCII values of said characters in said string;

concatenating said ASCII values of said characters beginning with an ASCII value of a first character in said string and continuing to concatenate an ASCII value of each of said characters sequentially through all said characters in said string to a last character of said string for use as an index;

wherein at said index either an address or related information resides;

wherein said related information is selected from a group consisting of said string of said characters, pointers to a prior index, pointers to a next index, pointers to a prior address, pointers to a next address, and any remaining data;

using said concatenated ASCII values of said characters as said index to a database to store in a computer, said related information at one of said index or at said address, or using said concatenated ASCII values to retrieve the related information from said computer wherein said string of said characters can be retrieved from said index in just one access or wherein the address of the related information stored in the computer can be retrieved from the database in just one access.

* * * * *